US010004112B2

(12) United States Patent
Sugimoto

(10) Patent No.: US 10,004,112 B2
(45) Date of Patent: Jun. 19, 2018

(54) MACHINE LEARNING APPARATUS AND COIL ELECTRIC HEATING APPARATUS

(71) Applicant: FANUC CORPORATION, Yamanashi (JP)

(72) Inventor: Yasunori Sugimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days. days.

(21) Appl. No.: 15/280,975

(22) Filed: Sep. 29, 2016

(65) Prior Publication Data

US 2017/0094722 A1   Mar. 30, 2017

(30) Foreign Application Priority Data

Sep. 30, 2015 (JP) .................................. 2015-194142

(51) Int. Cl.
  *H05B 1/02* (2006.01)
  *G06N 99/00* (2010.01)
(52) U.S. Cl.
  CPC ......... *H05B 1/0288* (2013.01); *G06N 99/005* (2013.01)
(58) Field of Classification Search
  None
  See application file for complete search history.

(56) References Cited

U.S. PATENT DOCUMENTS 5,630,957 A * 5/1997 Adkins .................... C21D 1/10
                                                           148/567
7,117,045 B2 * 10/2006 Hittle ................... G05B 13/027
                                                           123/689

(Continued)

FOREIGN PATENT DOCUMENTS

EP        2381394 A1    10/2011
JP        52-8548 A      1/1977

(Continued)

OTHER PUBLICATIONS

Anderson, Charles W., et al. "Synthesis of reinforcement learning, neural networks and PI control applied to a simulated heating coil." Artificial Intelligence in Engineering 11.4 (1997): 421-429.*

(Continued)

*Primary Examiner* — Kakali Chaki
*Assistant Examiner* — Daniel Pellett
(74) *Attorney, Agent, or Firm* — Hauptman Ham, LLP

(57) ABSTRACT

A machine learning apparatus includes a state observing unit and a learning unit. The state observing unit observes a state variable comprised of at least one of an adhesion state, a dielectric strength voltage, an electric heating time temperature, and an actual electric heating time value of a coil electrically heated by a coil electric heating unit, and at least one of an electric heating time command value, a voltage, and a current in the coil electric heating unit. The learning unit performs a learning operation by linking at least one of an adhesion state, a dielectric strength voltage, an electric heating time temperature, and an actual electric heating time value of the coil observed by the state observing unit to at least one of the electric heating time command value, the voltage, and the current, which are observed by the state observing unit.

6 Claims, 7 Drawing Sheets

(56) References Cited

U.S. PATENT DOCUMENTS

| | | | |
|---|---|---|---|
| 7,655,887 B2* | 2/2010 | Chen | H05B 1/0288 |
| | | | 219/202 |
| 2012/0223670 A1 | 9/2012 | Kinjo et al. | |
| 2013/0327313 A1* | 12/2013 | Arnold | F24H 9/2007 |
| | | | 126/344 |

FOREIGN PATENT DOCUMENTS

| | | |
|---|---|---|
| JP | 7-50218 A | 2/1995 |
| JP | 9-168261 A | 6/1997 |
| JP | 10-12358 A | 1/1998 |
| JP | 2002-231552 A | 8/2002 |
| JP | 2002-358836 A | 12/2002 |
| JP | 2005-71644 A | 3/2005 |
| JP | 2015-132388 | 7/2015 |
| WO | 2012/032776 A1 | 3/2012 |

OTHER PUBLICATIONS

Hafner, Roland, and Martin Riedmiller. "Reinforcement learning in feedback control." Machine learning 84.1 (2011): 137-169.*

Hayato Nakama et al., "Application of Modular Reinforcement Learning to the Control of Robot Having Three Different Sensors", IEICE Technical Report, NC2008-154 (Mar. 2009), Mar. 4, 2009, pp. 301-306, vol. 108, No. 480, The Institute of Electronics, Information and Communication Engineers, Tokyo Japan.

Xu Xiaoye et al., "Applying Q-Learning to Designing Feasible Morphing UAV Control System", Journal of Northwestern Polytechnical University, Jun. 2012, pp. 340-344, vol. 30 No. 3, China, with English Abstract copied from the last page of the Article.

* cited by examiner

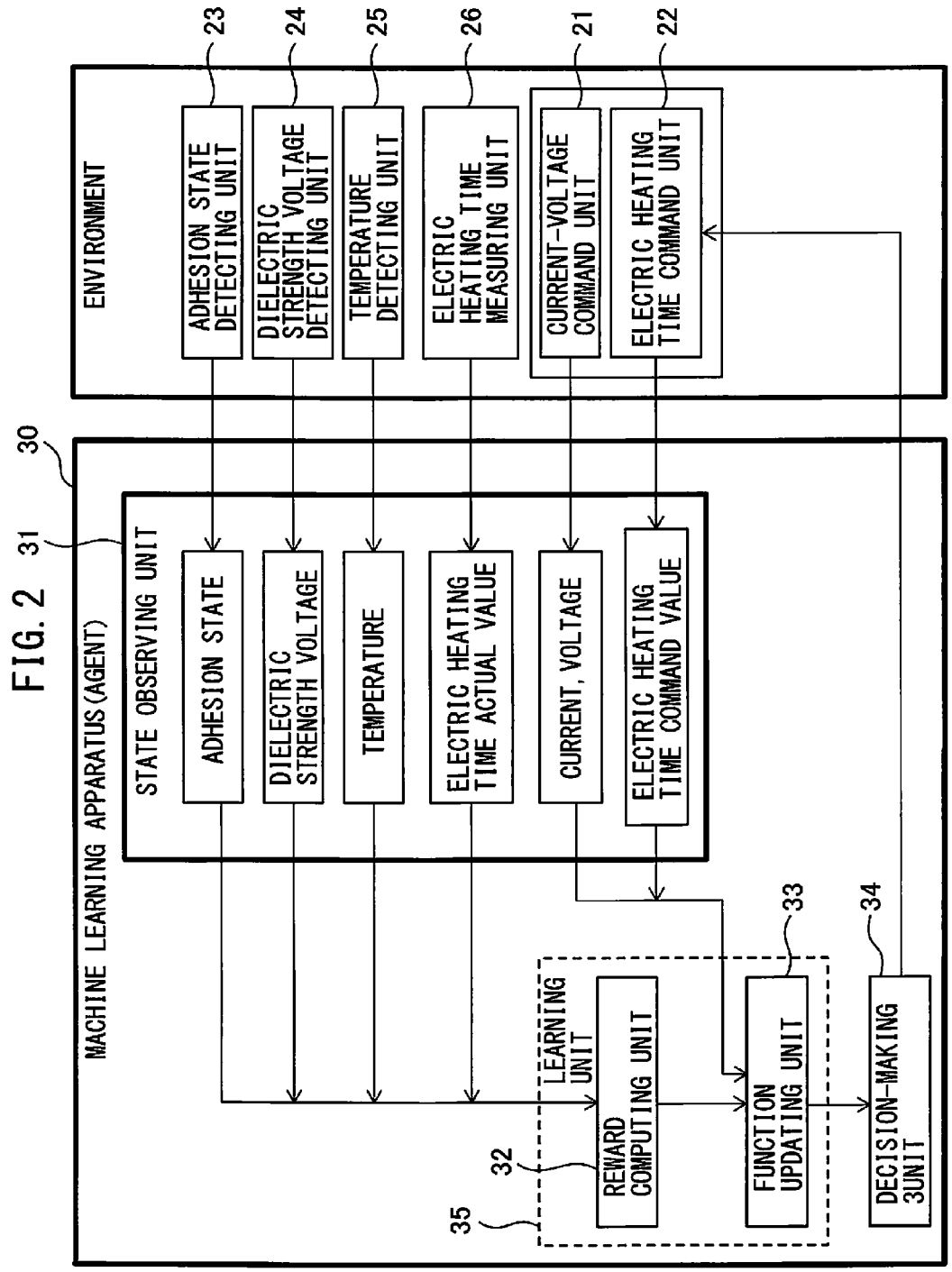

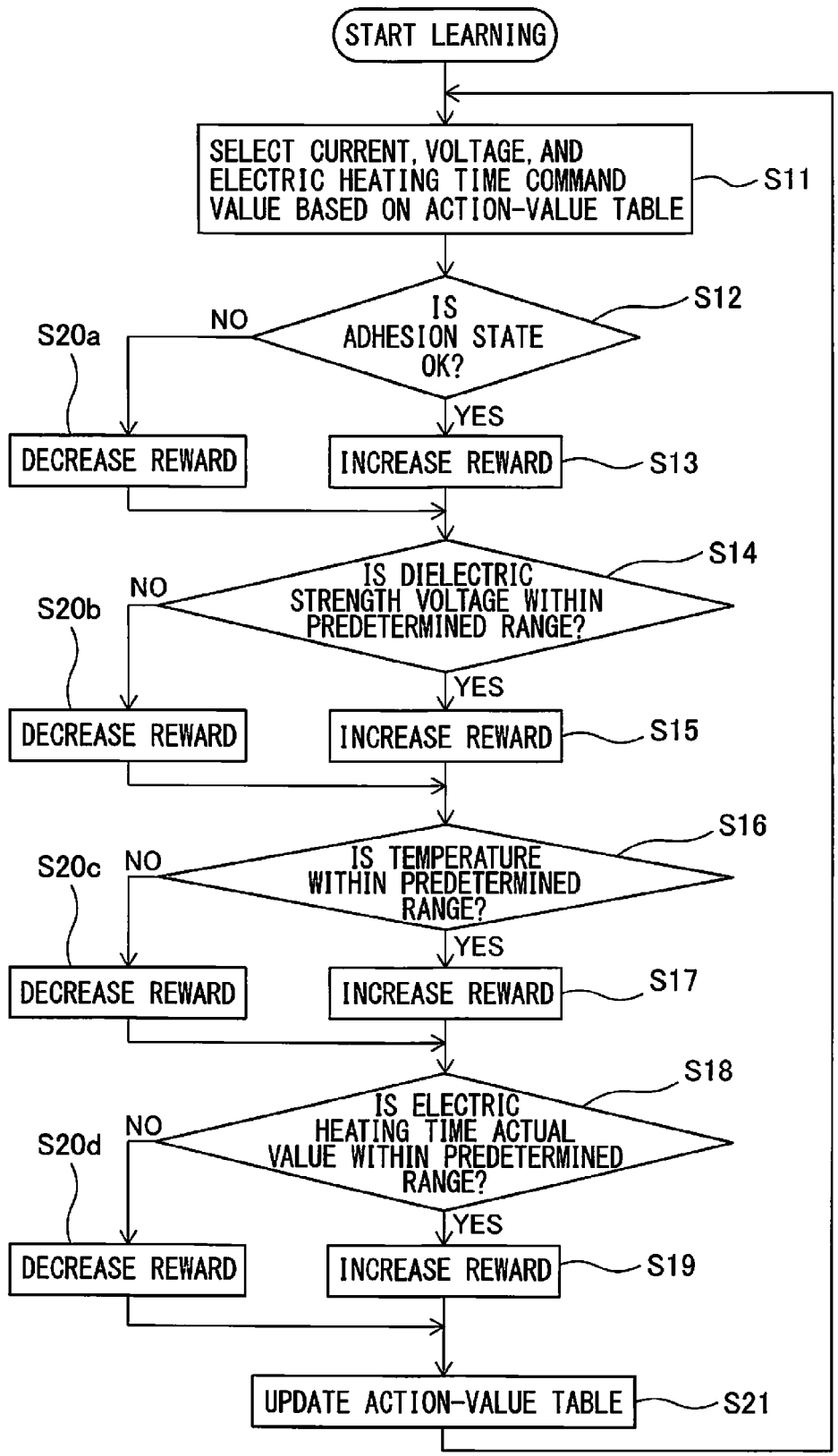

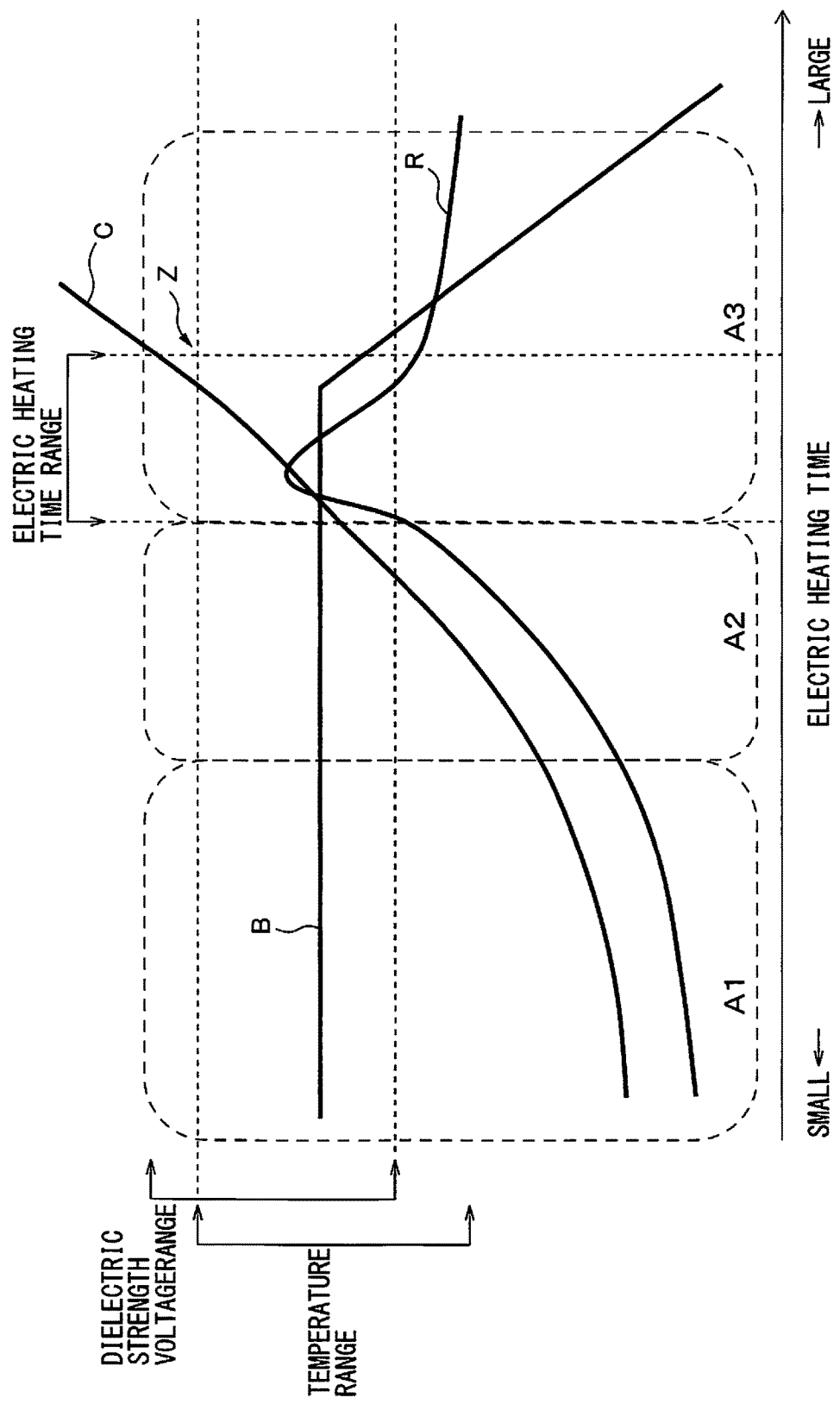

MACHINE LEARNING APPARATUS AND COIL ELECTRIC HEATING APPARATUS

RELATED APPLICATIONS

The present application claims priority to Japanese Patent Application Number 2015-194142 filed Sep. 30, 2015, the disclosure of which is hereby incorporated by reference herein in its entirety.

BACKGROUND OF THE INVENTION

1. Field of the Invention

The present invention relates to a machine learning apparatus and a coil electric heating apparatus including such a machine learning apparatus.

2. Description of the Related Art

A unit coil 50 (hereinafter simply referred to as "coil" in some cases) formed by a winding machine is fitted with a tooth part of a stator 60 as shown in FIG. 5A. Further, as shown in FIG. 5B, a plurality of unit coils 50 is arranged so as to be fitted with a plurality of tooth parts of the stator 50.

FIGS. 6A and 6B are partial sectional enlarged views of a unit coil. As shown in FIG. 6A, in order to fix the shape of a unit coil, hot-melt adhesive 3 is previously applied to a winding wire 2 (see Japanese Unexamined Patent Publication (Kokai) Nos. 2005-71644, 2002-231552, 7-50218, and 2002-358836). After the unit coil is wound, the winding wire 2 is energized to be heated (electrically heated). Consequently, as shown in FIG. 6B, the hot-melt adhesive 3 is melt to form a layer 3a surrounding a plurality of adjacent portions of the winding wire 2 that has been wound, so that the adjacent portions of the wound winding wire are bonded to one another.

SUMMARY OF THE INVENTION

However, when the degree of heating of the winding wire 2, which has been electrically heated, is insufficient, the adhesiveness of the hot-melt adhesive 3 decreases, and thus, the unit coil is uncoiled. When the degree of heating of the winding wire 2, which has been electrically heated, is excessive, the hot-melt adhesive 3 burns out, and has no adhesiveness. Further, a lot of labor and man-hour are required because it is necessary for an operator to manually set operation conditions through trial and error.

The present invention was made in light of the circumstances described above and has an object to provide a machine learning apparatus which can optimally electrically heat coils without manually setting detailed operation conditions, and a coil electric heating apparatus provided with such a learning apparatus.

To achieve the above object, according to a first aspect of the invention, there is provided a machine learning apparatus which can communicate with a coil electric heating unit and which learns an operation for causing the coil electric heating unit to electrically heat a coil. The machine learning apparatus includes a state observing unit and a learning unit. The state observing unit observes a state variable comprised of at least one of an adhesion state, a dielectric strength voltage, an electric heating time temperature, and an actual electric heating time value actual electric heating time value of the coil electrically heated by the coil electric heating unit, and at least one of an electric heating time command value, a voltage, and a current in the coil electric heating unit. The learning unit performs a learning operation by linking at least one of an adhesion state, a dielectric strength voltage, an electric heating time temperature, and an actual electric heating time value actual electric heating time value of the coil observed by the state observing unit to at least one of the electric heating time command value, the voltage, and the current, which are observed by the state observing unit.

According to a second aspect of the invention, in the machine learning apparatus according to the first aspect of the invention, the learning unit includes a reward computing unit and a function updating unit. The reward computing unit computes a reward based on at least one of an adhesion state, a dielectric strength voltage, an electric heating time temperature, and an actual electric heating time value actual electric heating time value of the coil observed by the state observing unit. The function updating unit updates a function for deciding, from the state variable at present, based on the reward computed by the reward computing unit, at least one of the electric heating time command value, the voltage, and the current.

According to a third aspect of the invention, the machine learning apparatus according to the first or second aspect of the invention includes a decision-making unit for deciding, from the state variable at present, based on a result of learning of the learning unit, an optimal value of at least one of the electric heating time command value, the voltage, and the current.

According to a fourth aspect of the invention, in the machine learning apparatus according to any of the first to third aspects of the invention, the learning unit computes the state variable observed by the state observing unit in a multilayer structure, to update the function on a real-time basis.

According to a fifth aspect of the invention, in the machine learning apparatus according to any of the first to fourth aspects of the invention, the function of the function updating unit is updated using a function updated by a function updating unit of another machine learning apparatus.

According to a sixth aspect of the invention, there is provided a coil electric heating apparatus including the machine learning apparatus according to any of the first to fifth aspects of the invention.

These objects, features, and advantages of the present invention and other objects, features, and advantages will become further clearer from the detailed description of typical embodiments illustrated in the appended drawings.

BRIEF DESCRIPTION OF THE DRAWINGS

FIG. 2 is an enlarged view of a machine learning device.

FIG. 3 is a flowchart of the operation of a machine learning device.

FIG. 4 is a view illustrating the relationship between, for example, electric heating time and electric heating time temperature.

DETAILED DESCRIPTION

Figure 1:
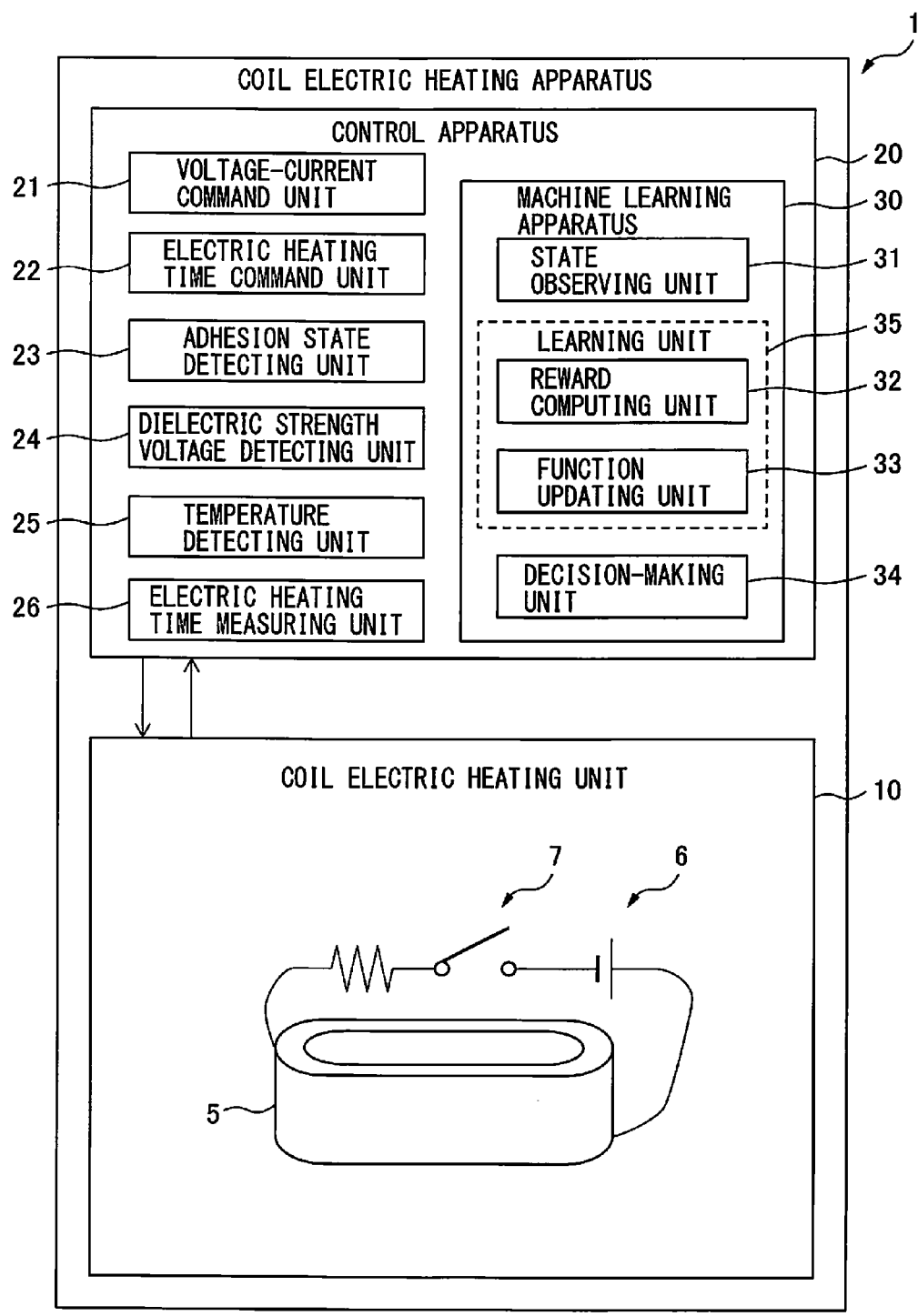
FIG. 1 is a block diagram of the functions of a coil producing apparatus according to the present invention.
Figure 5A:
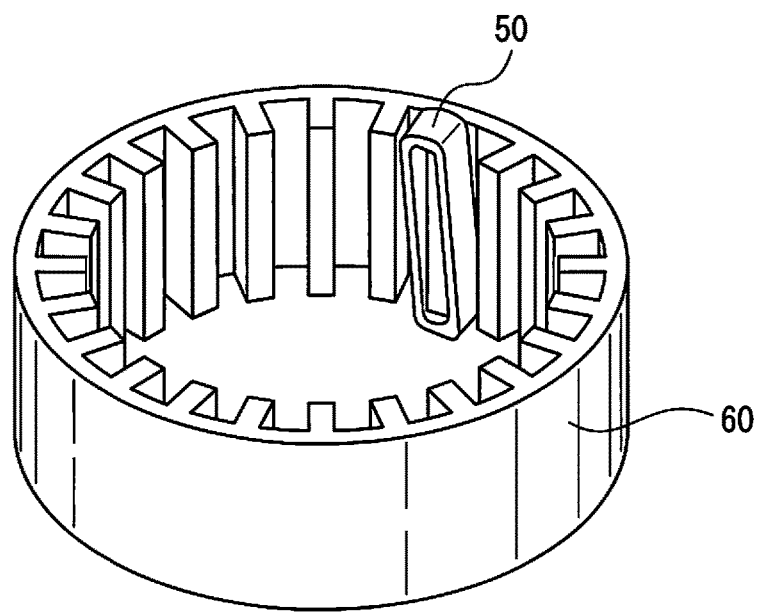
FIG. 5A is a view illustrating the state of a unit coil being fitted with an iron core.
Figure 5B:
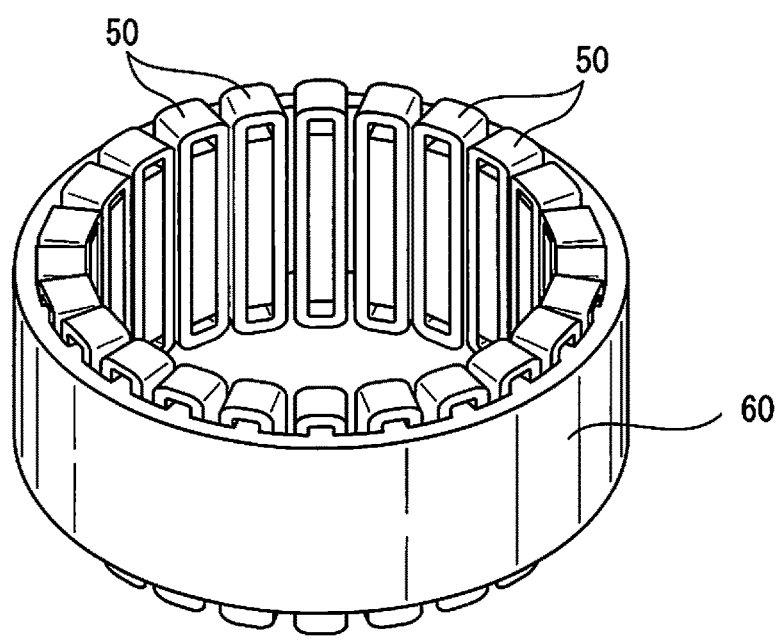
FIG. 5B is a view illustrating an iron core with which a plurality of unit coils is fitted.

Embodiments of the present invention will be described below with reference to the accompanying drawings. In the following figures, similar members are designated with the same reference numerals. These figures are properly modified in scale to assist the understanding thereof.

FIG. 1 is a block diagram of the functions of a coil electric heating apparatus according to the present invention. As shown in FIG. 1, a coil electric heating apparatus 1 mainly includes a coil electric heating unit 10 and a control apparatus 20 for controlling the coil electric heating unit 10.

Figure 6A:
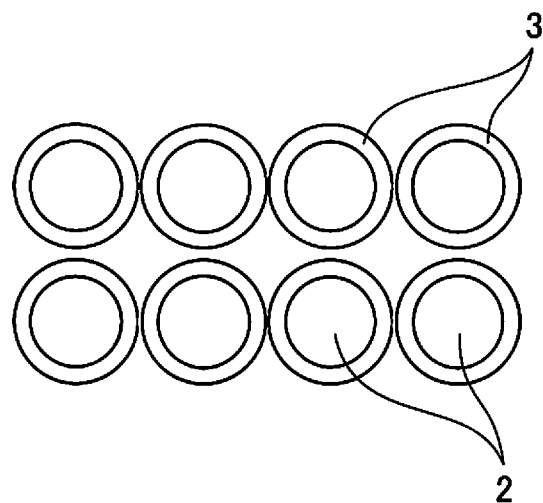
FIG. 6A is a first partial sectional enlarged view of a unit coil.
Figure 6B:
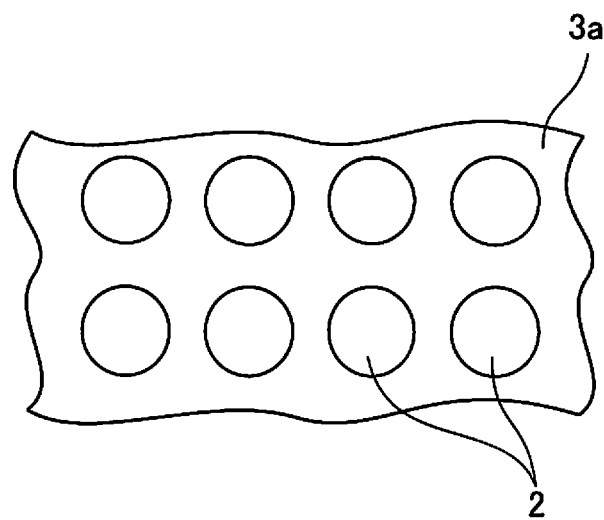
FIG. 6B is a second partial sectional enlarged view of a unit coil.

FIG. 1 shows, in its lower part, the coil electric heating unit 10. The coil electric heating unit 10 energizes a coil 5 which is wound by a winding machine which is not illustrated. Specifically, as shown in FIG. 1, a power source 6 is connected to the starting end and the terminal end of winding of the coil 5, to energize the coil 5. Note that, as described above, a wire rod 2 of the coil 5 is coated with hot-melt adhesive 3 (see FIG. 6A).

The control apparatus 20 is a digital computer, and includes a current-voltage command unit 21 for instructing current and voltage, at which the coil is energized, and an electric heating time command unit 22 for instructing time for which the coil electric heating unit 10 performs an electric heating operation. The command values to be instructed by the current-voltage command unit 21 and the electric heating time command unit 22 are decided by a machine learning apparatus 30 that will be described later.

The control apparatus 20 also includes an adhesion state detecting unit 23 for detecting the state of adhesion of a produced coil. The adhesion state detecting unit 23 is, for example, a camera. The control apparatus 20 further includes a dielectric strength voltage detecting unit 24 for detecting the dielectric strength voltage of a produced coil, and a temperature detecting unit 25 for detecting the temperature of a coil that is electrically heated. The control apparatus 20 further includes an electric heating time detecting unit 26 for detecting the elapsed time for which the coil electric heating unit 10 actually electrically heats a coil.

As shown in FIG. 1, the control apparatus 20 further includes the machine learning apparatus 30. The machine learning apparatus 30 may be an external apparatus for the control apparatus 20. In this instance, the machine learning apparatus 30 is connected to the control apparatus 20 and the coil electric heating unit 10 so as to communicate with each other.

With reference to FIG. 2 which is an enlarged view of a machine learning apparatus, the machine learning apparatus 30 includes a state observing unit 31 for observing a state variable composed of at least one of an adhesion state, a dielectric strength voltage, an electric heating time temperature, and an actual electric heating time value actual electric heating time value of a coil electrically heated by the coil electric heating unit 10, and at least one of an electric heating time command value, a voltage, and a current in the coil electric heating unit 10. The state observing unit 31 can successively store each state variable with a time at which the state variable is observed.

The machine learning apparatus 30 also includes a learning unit 35 for performing a learning operation by linking at least one of an adhesion state, a dielectric strength voltage, an electric heating time temperature, and an actual electric heating time value actual electric heating time value of a coil, which are observed by the state observing unit 31, to at least one of an electric heating time command value, a voltage, and a current, which are observed by the state observing unit 31.

The learning unit 35 can perform various types of machine learning, such as supervised learning, unsupervised learning, semi-supervised learning, reinforcement learning, transduction, multitask learning, etc. In the following description, the learning unit 35 performs reinforcement learning using Q-learning.

As is clear from FIG. 2, the machine learning apparatus 30 corresponds to an agent in reinforcement learning. Further, the adhesion state detecting unit 23, the dielectric strength voltage detecting unit 24, the temperature detecting unit 25, and the electric heating time detecting unit 26 detect the state of environment.

The learning unit 35 for performing reinforcement learning includes a reward computing unit 32 for computing a reward based on at least one of an adhesion state, a dielectric strength voltage, an electric heating time temperature, and an actual electric heating time value actual electric heating time value of a coil, which are observed by the state observing unit 31, and a function updating unit 33 (artificial intelligence) for updating a function, for example, an action-value function (action-value table) for deciding, from the state variable at present, based on the reward computed by the reward computing unit 32, at least one of an electric heating time command value, a voltage, and a current. As a matter of course, the function updating unit 33 may update other functions.

The machine learning apparatus 30 also includes a decision-making unit 34 for deciding, from the state variable at present, based on the result of learning of the learning unit 35, the optimal value of at least one of an electric heating time command value, a voltage, and a current. The decision-making unit 34 learns selection of a better action (decision-making). Note that the decision-making unit 34 may be included in the control apparatus 20 and not in the machine learning apparatus 30.

FIG. 3 is a flowchart of the operation of a machine learning device. The operation of the machine learning apparatus 30 will be described with reference to FIGS. 1 to 3. The contents shown in FIG. 3 are performed every time the coil electric heating unit 10 performs an electric heating operation.

First, in step S11 in FIG. 3, the coil electric heating unit 10 selects an electric heating time command value, and command values of voltage and current, and instructs the same. These command values are randomly selected from their respective predetermined ranges.

Alternatively, in, for example, the electric heating time command value, the minimum value in the predetermined range may be initially selected, and then, a value increased by a very small amount may be selected in the subsequent cycle. The same is true for the other command values. The processes in FIG. 3 may be repeated so that all combinations of an electric heating time command value, and command values of voltage and current are selected.

Then, in step S12, the state of adhesion in a coil is detected by the adhesion state detecting unit 23, and whether the adhesion state is good is determined. FIG. 4 is a view illustrating an example of the relationship between electric heating time and electric heating time temperature. The horizontal axis in FIG. 4 represents the actual value of electric heating time, and the vertical axis in FIG. 4 represents the dielectric strength voltage, electric heating time temperature, and adhesion state of a coil. Note that, in FIG.

4, a region A1 is a region in which the adhesion state of a coil is bad, a region A2 is a region in which the adhesion state is normal, and a region A3 is a region in which the adhesion state is good. Further, in FIG. 4, a straight line B represents the dielectric strength voltage of a coil, and a curved line C represents the electric heating time temperature of a coil. Further, a curved line R shown in FIG. 4 represents the reward.

As shown in the regions A1 to A3 in FIG. 4, the adhesion state of a coil improves as the electric heating time elongates, and is most preferable when the electric heating time remains within the region A3, and accordingly, the winding wire 2 is not uncoiled, and the hot-melt adhesive 3 of the winding wire 2 does not burn out. Further, as designated by the straight line B, when the electric heating time exceeds a predetermined value, the dielectric strength voltage drastically decreases. As designated by the straight line C, the electric heating time temperature of a coil increases along with the electric heating time.

As designated by the curved line R in FIG. 4, when the dielectric strength voltage of a coil is included in a predetermined dielectric strength voltage range and when an electric heating time temperature actual value is included in a predetermined temperature range, a reward increases. However, when an actual electric heating time value becomes larger than a predetermined time, a reward drastically decreases. Regarding the increase and decrease of a reward, which will be described below, the amount of increase and decrease is determined based on, for example, the contents of FIG. 4.

Referring again to FIG. 3, when the adhesion state is good in step S12, a reward increases in step S13. In contrast, when the adhesion state is not good, a reward decreases or remains unchanged in step S20.

Subsequently, in step S14, whether the dielectric strength voltage of a coil, which is detected by the dielectric strength voltage detecting unit 24, is included in the predetermined dielectric strength voltage range is determined. When the dielectric strength voltage is included in the predetermined dielectric strength voltage range, a reward increases in step S15. When the dielectric strength voltage is not included in the predetermined dielectric strength voltage range, a reward decreases or remains unchanged in step S20. Note that the dielectric strength voltage is preferably high, and the upper limit of the dielectric strength voltage range is not required in some embodiments.

Subsequently, in step S16, whether the electric heating time temperature of a coil, which is detected by the temperature detecting unit 25, is included in the predetermined temperature range is determined. When the electric heating time temperature of the coil is included in the predetermined temperature range, a reward increases in step S17. When the electric heating time temperature of the coil is not included in the predetermined temperature range, a reward decreases or remains unchanged in step S20. It is preferable that the electric heating time temperature remains within the temperature range and in the vicinity of the upper limit of the temperature range.

Subsequently, in step S18, whether the actual electric heating time value detected by the electric heating time detecting unit 26 is included in a predetermined electric heating time range is determined. When the actual electric heating time value is included in the predetermined electric heating time range, a reward increases in step S19. When the actual electric heating time value is not included in the predetermined electric heating time range, a reward decreases or remains unchanged in step S20. Note that the actual electric heating time value is preferably small, and the lower limit of the electric heating time range is not required in some embodiments.

Such increase or decrease in a reward is computed by the reward computing unit 32. The increased amount or the decreased amount of a reward may vary in each step. Alternatively, at least one determination step of steps S12, S14, S16, and S18 and associated reward steps can be omitted.

After that, in step S19, the function updating unit 33 updates an action-value function. Q-learning performed by the learning unit 35 is a method for learning a value (action's value) Q(s, a) for selecting an action a under a given environment state s. Consequently, an action a having the highest Q(s, a) is selected at a given state s. In Q-learning, various actions a are performed under a given state s through trial and error, and then, rewards at that time are used to learn a correct Q(s, a). The update expression for the action-value function Q(s, a) is given by Equation (1) below:

$$Q(s_t, a_t) \leftarrow Q(s_t, a_t) + \alpha \left( r_{t+1} + \gamma \max_a Q(s_{t+1}, a) - Q(s_t, a_t) \right)$$

where $s_t$ is the environment at time t, and at is the action at time t. Upon the action $a_t$, the environment changes to $s_{t+1}$, the reward $r_{t+1}$ is computed by the change in the environment. The term, to which "max" is appended, is obtained by multiplying the Q-value, which is obtained when the action a having the highest Q-value (at that time) is selected under the state $s_{t+1}$, by γ. γ is the discount rate having a range of 0<γ≤1 (usually, 0.9 to 0.99), and α is the learning factor having a range of 0<α≤1 (usually, approximately 0.1).

This equation expresses that, if an evaluation value $Q(s_{t+1}, \max a_{t+1})$ of the optimal action in a subsequent environment state caused by the action a is greater than the evaluation value $Q(s_t, a_t)$ of the action a in the state s, $Q(s_t, a_t)$ is increased, and in the contrary case, i.e., the evaluation value $Q(s_{t+1}, \max a_{t+1})$ is smaller than the evaluation value $Q(s_t, a_t)$, $Q(s_t, a_t)$ is decreased. In short, the value of a given action in a given state is intended to approach the value of an optimal action in the subsequent state caused by the given action. In other words, the learning unit 35 updates the optimal values of an electric heating time command value for a coil, and command values of voltage and current.

As described above, in step S21, the function updating unit 33 updates an action-value function using Equation (1) above. Then the process is returned to step S11, and another electric heating time command value for the coil, and other command values of voltage and current are selected, and then, an action-value function is updated in a similar manner. Note that, in place of an action-value function, an action-value table may be updated.

In reinforcement learning, the learning unit 35 as an agent decides an action based on the state of environment. The action in this respect means that the decision-making unit 34 selects new values of the electric heating time command value and command values of voltage and current, to perform the action in accordance with these new values. These new values of various command values change the environment shown in FIG. 2, for example, an adhesion state, a dielectric strength voltage, an electric heating time temperature, and an actual electric heating time value of a coil. With such a change in the environment, rewards are given to the machine learning device 30 as described above, and the decision-making unit 34 of the machine learning device 30 learns selection (decision-making) of a better action, to obtain, for example, higher rewards.

Thus, repeating the processes shown in FIG. 3 many times improves the reliability of the action-value function. Then, in step S11, selecting, based on the reliable action-value function, an electric heating time command value and command values of voltage and current, to increase, for example, Q-value enables more appropriate decision of, for example, a more suitable dimension command value. In an example shown in FIG. 4, the results of learning of the machine learning device 30 converge on an area Z defined by dotted lines.

As described above, the contents updated by the function updating unit 33 of the machine learning apparatus 30 according to the present invention can be automatically decided as an optimal electric heating time command value and optimal command values of voltage and current, which are necessary to form a coil. Further, the introduction of such the machine learning device 30 to the control apparatus 20 enables automatic adjustment of, for example, an electric heating time command value. Thus, unit coils having a stable adhesion force can be automatically produced, and variation in coils due to the individual difference between coils can be eliminated. Further, following the results of learning of the machine learning apparatus eliminates the operator's necessity of manually setting operating conditions during production of coils. Thus, the labor and man-hour necessary to produce coils can be reduced. Consequently, the production efficiency can be improved.

In embodiments that are not illustrated, another machine learning apparatus 30' having a configuration similar to that of the machine learning device 30 is incorporated in another control apparatus 20' of another coil electric heating unit 10'. The control apparatus 20' and the control apparatus 20 are connected so as to communicate with each other. In such a case, a function updated by another function updating unit 33' of the machine learning apparatus 30' can be duplicated in the function updating unit 33 of the machine learning apparatus 30. This function may be used to update the function in the function updating unit 33. In this instance, it will be understood that the reliable results of learning can be diverted.

Alternatively, a function approximated using a neural network that will be described later may be used as an action-value function. In this respect, the state variable observed by the state observing unit 31 may be computed in a multilayer structure, to update the action-value function on a real-time basis. Thus, it will be understood that more appropriate results of learning can be obtained. This is extremely useful for data having a huge volume of information on "s" and "a", for example, image data.

The machine learning apparatus 30 etc. shown in FIG. 2 will be described in detail again although there is some repetition of information. The machine learning apparatus 30 has a function for analytically extracting useful rules or knowledge representations, criteria for determination, etc. from the assembly of data inputted to the apparatus, and a function for outputting the results of determination, and learning knowledges. There are various machine learning methods, and the methods are roughly divided into "supervised learning", "unsupervised learning", and "reinforcement learning". In order to achieve these leaning method, there is another method referred to as "deep learning" for learning extraction of feature quantity itself.

"Supervised learning" is a method in which a large volume of input-output (label) paired data are given to a learning apparatus, so that characteristics of these datasets can be learned, and a model for inferring an output value from input data, i.e., the input-output relation can be inductively acquired. In the present embodiment, this learning method can be used to infer a dimension actual value of a coil from the above-described various command values for the coil. This method can be achieved using an algorithm, for example, a neural network that will be described later.

"Unsupervised learning" is a method in which a large volume of input-only data are given to a learning apparatus, so that the distribution of the input data can be learned, and a device for, for example, compressing, classifying, and fairing the input data can be learned even if the corresponding teacher output data are not given. For example, the characteristics of these datasets can be clustered based on their similarity. The result obtained from the learning is used to set a certain criterion, and then, the allocation of output is performed so as to optimize the criterion, so that the prediction of output can be achieved. There is another problem setting method situated between "unsupervised learning" and "supervised learning", which is known as "semi-supervised learning". In this learning method, a small volume of input-output paired data and a large volume of input-only data are provided. In the present embodiment, data, which can be acquired even when a winding machine is not actually operated, are used in unsupervised learning, to efficiently perform learning.

Problems are set in reinforcement learning as follows.
A winding machine and a control apparatus for the winding machine observe the state of environment, and decide an action.
The environment varies in accordance with some rules, and your action can vary the environment.
A reward signal is returned at each action.
The target of maximization is the sum of (discounted) rewards to be obtained now and in the future.
Learning starts from the state in which a result caused by an action is completely unknown, or is incompletely known. The winding machine can acquire the results as data only after it actually starts operating. In other words, it is necessary to search the optimal action through trial and error.
It is also possible to set, as an initial state, the state, in which a prior learning (e.g., the above supervised learning, or inverse reinforcement learning) is performed so as to emulate the action of a person, and start learning from a good starting point.

"Reinforcement learning" is a learning method for learning not only determinations or classifications but also actions, to learn an appropriate action based on the interaction of environment to an action, i.e., an action to maximize rewards to be obtained in the future. This indicates, in the present embodiment, that an action, which can exert an effect on the future, can be acquired. The explanation of reinforcement learning will be continued below using, for example, Q-learning, but reinforcement learning is not limited to Q-learning.

Q-learning is a method for learning a value $Q(s, a)$ for selecting an action a under a given environmental state s. In other words, it is only required that the action a having the highest value $Q(s, a)$ is selected as an optimal action, under a given state s. However, initially, the correct value of the value $Q(s, a)$ for a combination of state s and action a is completely unknown. Then, the agent (the subject of an action) selects various actions a under a given state s, and gives rewards to the actions a at that time. Thus, the agent learns selection of a better action, i.e., the correct value $Q(s, a)$.

As a result of the action, maximization of the sum of rewards to be obtained in the future is desired, and accordingly, $Q(s, a)=E[\Sigma \gamma^t r_t]$ is aimed to be finally achieved (An expected value is set for the time when the state varies in accordance with the optimal action. Of course, the expected value is unknown, and accordingly, should be learned while being searched). The update expression for such a value $Q(s, a)$ is given, for example, by:

$$Q(s_t, a_t) \leftarrow Q(s_t, a_t) + \alpha \left( r_{t+1} + \gamma \max_a Q(s_{t+1}, a) - Q(s_t, a_t) \right)$$

(This equation is identical to Equation (1) above.)
where $s_t$ is the state of environment at time t, and at is the action at time t. Upon the action $a_t$, the state changes to $s_{t+1}$. $r_{t+1}$ is the reward to be received upon a change in the state. The term, to which "max" is appended, is obtained by multiplying the Q-value, which is obtained when the action a having the highest Q-value at that time is selected under the state $s_{t+1}$, by $\gamma$. $\gamma$ is the parameter having a range of $0<\gamma \leq 1$, and is called discount rate. $\alpha$ is the learning factor, and has a range of $0<\alpha \leq 1$.

This equation expresses a method for updating an evaluation value $Q(s_t, a_t)$ of an action $a_t$ in a state $s_t$ based on a reward $r_{t+1}$ which has been returned as a result of a trial $a_t$. If an evaluation value $Q(s_{t+1}, \max a_{t+1})$ of the optimal action max a in a subsequent state caused by the reward $r_{t+1}$+ the action a is greater than the evaluation value $Q(s_t, a_t)$ of the action a in the state s, $Q(s_t, a_t)$ is increased. In the contrary case, i.e., the evaluation value $Q(s_{t+1}, \max a_{t+1})$ is smaller than the evaluation value $Q(s_t, a_t)$, $Q(s_t, a_t)$ is decreased. In other words, the value of a given action in a given state is intended to approach the reward immediately returned as a result, and the value of an optimal action in the subsequent state caused by the given action.

Examples of the method for expressing Q(s, a) on a computer include a method for preserving the values of all state-action pairs (s, a) as a table (action-value table), and a method for preparing a function to approximate Q(s, a). In the latter method, the above update expression can be achieved by adjusting a parameter of the approximate function using a method, such as stochastic gradient descent. Examples of the approximate function include a neural network that will be described later.

Figure 7:
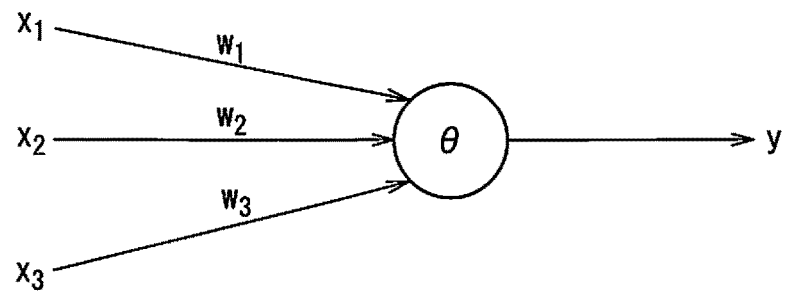
FIG. 7 is a schematic diagram of a neuron model.

As an approximate algorithm of a value function in supervised learning, unsupervised learning, and reinforcement learning, a neural network can be used. The neural network is comprised of, for example, an arithmetic device and a memory, which realize a neural network simulating a neuron model as shown in FIG. 7. FIG. 7 is a schematic diagram illustrating a neuron model.

As shown in FIG. 7, a neuron outputs an output y in response to a plurality of inputs x (inputs x1 to x3 are provided herein as an example). Weights w (w1 to w3) are applied to the corresponding inputs x1 to x3. This causes the neuron to output the output y that is expressed by the equation below. Note that the inputs x, the output y, and the weights w are vectors.

$$y = f_k(\Sigma_{i=1}^n x_i w_i - \theta)$$

where $\theta$ is the bias, and $f_k$ is the activation function.

Figure 8:
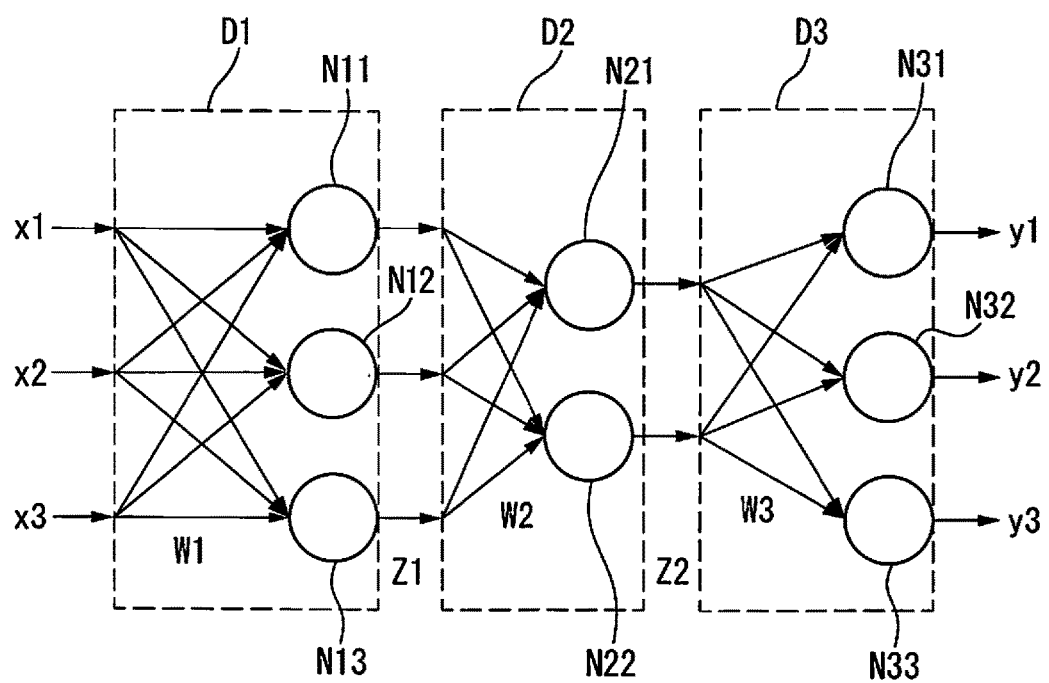
FIG. 8 is a schematic diagram of a three-layer neural network model.

A three-layer weighted neural network comprised of a combination of neurons as described above will now be described below with reference to FIG. 8. FIG. 8 is a schematic diagram illustrating a weighted neural network having three layers D1 to D3.

As shown in FIG. 8, a plurality of inputs x (inputs x1 to x3 is provided herein as an example) are inputted from the left side of the neural network, and results y (results y1 to y3 are provided herein as an example) are outputted from the right side of the neural network.

Specifically, the inputs x1 to x3, to which the corresponding weights have been applied, are respectively inputted to three neurons N11 to N13. These weights applied to the inputs are collectively designated by w1.

The neurons N11 to N13 respectively output z11 to z13. These z11 to z13 are collectively designated by a feature vector z1, and can be treated as a vector obtained by extracting a feature amount of an input vector. This feature vector z1 is a feature vector between the weight w1 and the weight w2.

The feature vectors z11 to z13, to which the corresponding weights have been applied, are inputted to two neurons N21 and N22. These weights applied to the feature vectors are collectively designated by w2.

The neurons N21 and N22 respectively output z21 and z22. These z21 and z22 are collectively designated by a feature vector z2. This feature vector z2 is a feature vector between the weight w2 and the weight w3.

The feature vectors z21 and z22, to which the corresponding weights have been applied, are inputted to three neurons N31 to N33. These weights applied to the feature vectors are collectively designated by w3.

Finally, the neurons N31 to N33 respectively output the results y1 to y3.

The operation of the neural network includes a learning mode and a value prediction mode. Learning datasets are used to learn the weights w in the learning mode, and parameters obtained from the learning are used to determine the action of the winding machine in the prediction mode (For convenience, the term "prediction" is used herein, but various tasks including detection, classification, deduction, etc. can be performed).

It is possible to perform not only learning (online learning), in which data that have been acquired by actually operating the winding machine in the prediction mode are immediately learned, and are reflected in a subsequent action, but also learning (batch learning), in which previously collected data are collectively learned using a group of the data, and thereafter, a detection mode is performed using parameters obtained from the learning. Another intermediate learning mode can be interposed every time a predetermined amount of data is collected.

The weights w1 to w3 can be learned by an error back propagation method. The information on errors is introduced from the right side to the left side. The error back propagation method is a method for adjusting (learning) each weight so as to reduce the difference between the output y when the input x is inputted and the true output y (teacher) in each neuron.

In such a neural network, three or more layers can be provided (This is called deep learning). An arithmetic device, which extracts features from input data in a stepwise fashion to return a result, can be automatically acquired from only teacher data.

Thus, the machine learning device 30 is provided with the state observation unit 31, the learning unit 35, and the decision-making unit 34, to perform Q-learning, as shown in FIG. 2. However, the machine learning method which can be applied to the present invention is not limited to Q-learning. When, for example, supervised learning is applied, the value function corresponds to the learning model, and the reward corresponds to the error.

Effect of the Invention

In the first to third aspects of the invention, a machine learning apparatus, which can automatically decide an optimal adhesion state etc. of a coil without the operator's necessity of manually setting operating conditions, can be provided.

In the fourth aspect of the invention, appropriate results of learning can be obtained.

In the fifth aspect of the invention, the results of learning of a machine learning apparatus can be incorporated in another machine learning apparatus, and thus, reliable results of learning can be diverted.

In the sixth aspect of the invention, following the results of learning of the machine learning apparatus eliminates the operator's necessity of manually setting operating conditions during electric heating of coils. Thus, the labor and man-hour necessary to electrically heat coil can be reduced. Further, unit coils having a stable adhesion force can be automatically produced, and variation in coils due to the individual difference between coils can be eliminated.

The present invention has been described above using exemplary embodiments. However, a person skilled in the art would understand that the aforementioned modifications and various other modifications, omissions, and additions can be made without departing from the scope of the present invention.

What is claimed is:

1. A control apparatus for controlling a coil electric heating unit, the control apparatus comprising a machine learning apparatus communicable with the coil electric heating unit and configured to learn an operation for causing the coil electric heating unit to electrically heat a coil, the machine learning apparatus comprising:
   a state observing unit for observing a state variable comprising:
      at least one of an adhesion state of the coil, a dielectric strength voltage of the coil, an electric heating time temperature, and an actual electric heating time value of the coil electrically heated by the coil electric heating unit, and
      at least one of an electric heating time command value, a voltage, and a current in the coil electric heating unit; and
   a learning unit for performing a learning operation by linking
      at least one of the adhesion state of the coil, the dielectric strength voltage of the coil, the electric heating time temperature, and the actual electric heating time value of the coil observed by the state observing unit
      to at least one of the electric heating time command value, the voltage, and the current in the coil electric heating unit, which are observed by the state observing unit
   wherein the learning unit comprises:
      a reward computing unit for computing a reward based on at least one of the adhesion state of the coil, the dielectric strength voltage of the coil, the electric heating time temperature, and the actual electric heating time value of the coil observed by the state observing unit; and
      a function updating unit for updating a function for deciding, from the state variable at present, based on the reward computed by the reward computing unit, at least one of the electric heating time command value, the voltage, and the current in the coil electric heating unit,
   wherein the learning unit is configured to compute the state variable observed by the state observing unit in a multilayer structure, to update the function on a real-time basis, and
   wherein the control apparatus is configured to control the coil electric heating unit to electrically heat the coil based on the at least one of the electric heating time command value, the voltage, and the current in the coil electric heating unit as decided in accordance with the updated function.

2. The control apparatus according to claim 1, further comprising a decision-making unit for deciding, from the state variable at present, based on a result of learning of the learning unit, an optimal value of at least one of the electric heating time command value, the voltage, and the current in the coil electric heating unit.

3. The control apparatus according to claim 1, wherein the function updating unit is configured to update the function by using a function updated by a function updating unit of a different machine learning apparatus.

4. A coil electric heating apparatus comprising a control apparatus according to claim 1.

5. The control apparatus according to claim 1, wherein
   the state variable comprises the adhesion state of the coil, and
   the reward computing unit is configured to compute the reward based on the adhesion state of the coil.

6. The control apparatus according to claim 1, wherein
   the state variable comprises all of the adhesion state of the coil, the dielectric strength voltage of the coil, the electric heating time temperature, and the actual electric heating time value of the coil observed by the state observing unit, and
   the reward computing unit is configured to compute the reward based on all of the adhesion state of the coil, the dielectric strength voltage of the coil, the electric heating time temperature, and the actual electric heating time value of the coil observed by the state observing unit.

* * * * *